March 29, 1960  J. E. WHEELER  2,930,496
STORAGE APPARATUS
Filed April 17, 1956  12 Sheets-Sheet 1

INVENTOR
James E. Wheeler
BY Stevens, Davis, Miller and Mosher
ATTORNEYS

March 29, 1960　　J. E. WHEELER　　2,930,496
STORAGE APPARATUS

Filed April 17, 1956　　　　　　　　　12 Sheets-Sheet 3

INVENTOR
James E. Wheeler
BY Stevens, Davis, Miller and Mosher
ATTORNEYS

March 29, 1960 J. E. WHEELER 2,930,496
STORAGE APPARATUS
Filed April 17, 1956 12 Sheets-Sheet 5

INVENTOR
James E. Wheeler

BY Stevens, Davis, Miller and Mosher
ATTORNEYS

March 29, 1960 J. E. WHEELER 2,930,496
STORAGE APPARATUS

Filed April 17, 1956 12 Sheets-Sheet 8

INVENTOR
James E. Wheeler
BY Stevens, Davis, Miller & Mosher
ATTORNEYS

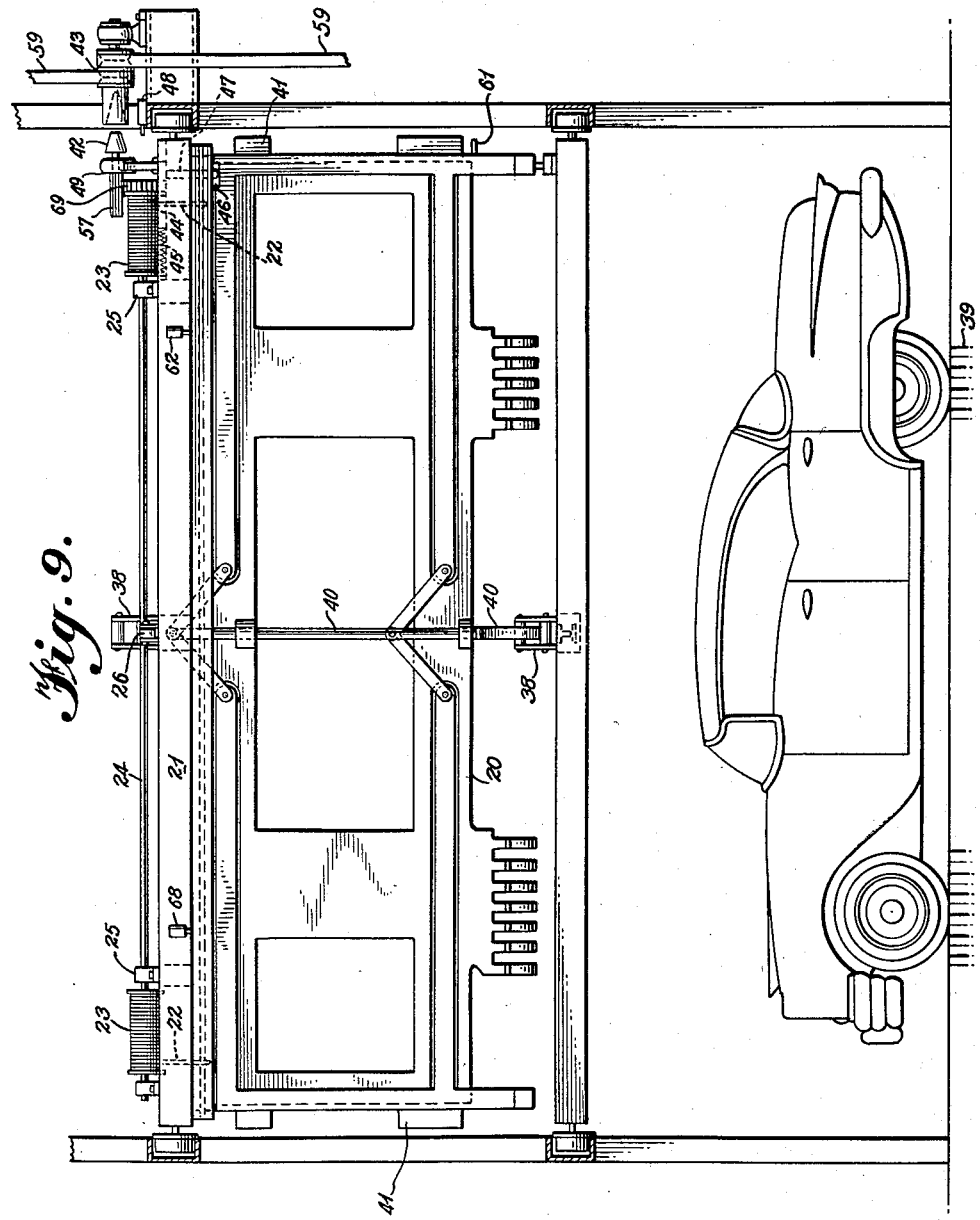

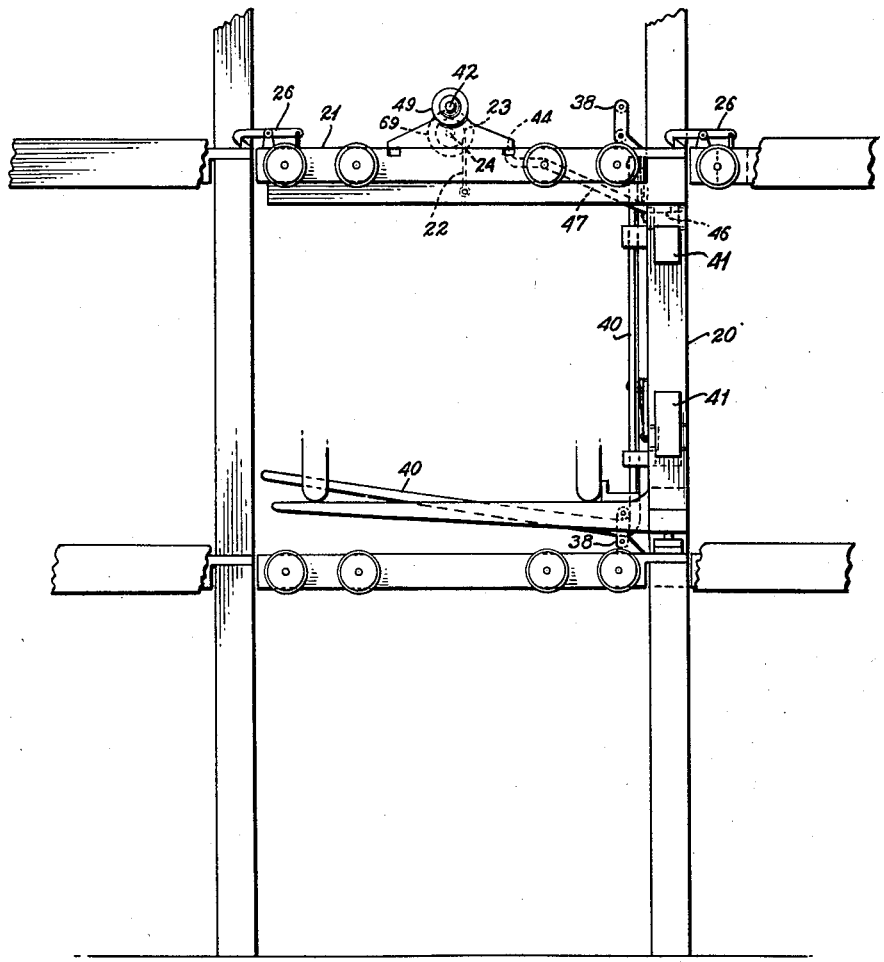
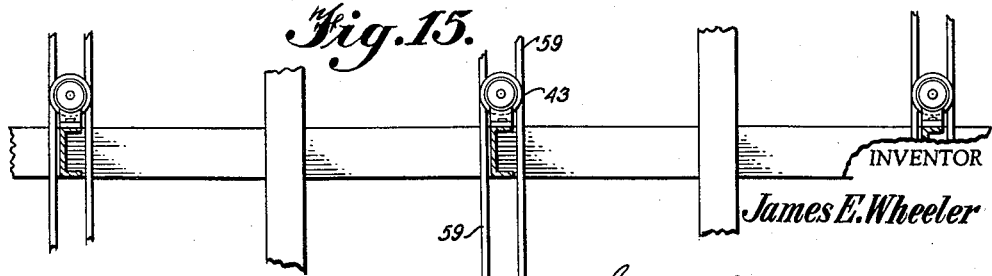

March 29, 1960     J. E. WHEELER     2,930,496
STORAGE APPARATUS
Filed April 17, 1956     12 Sheets-Sheet 11
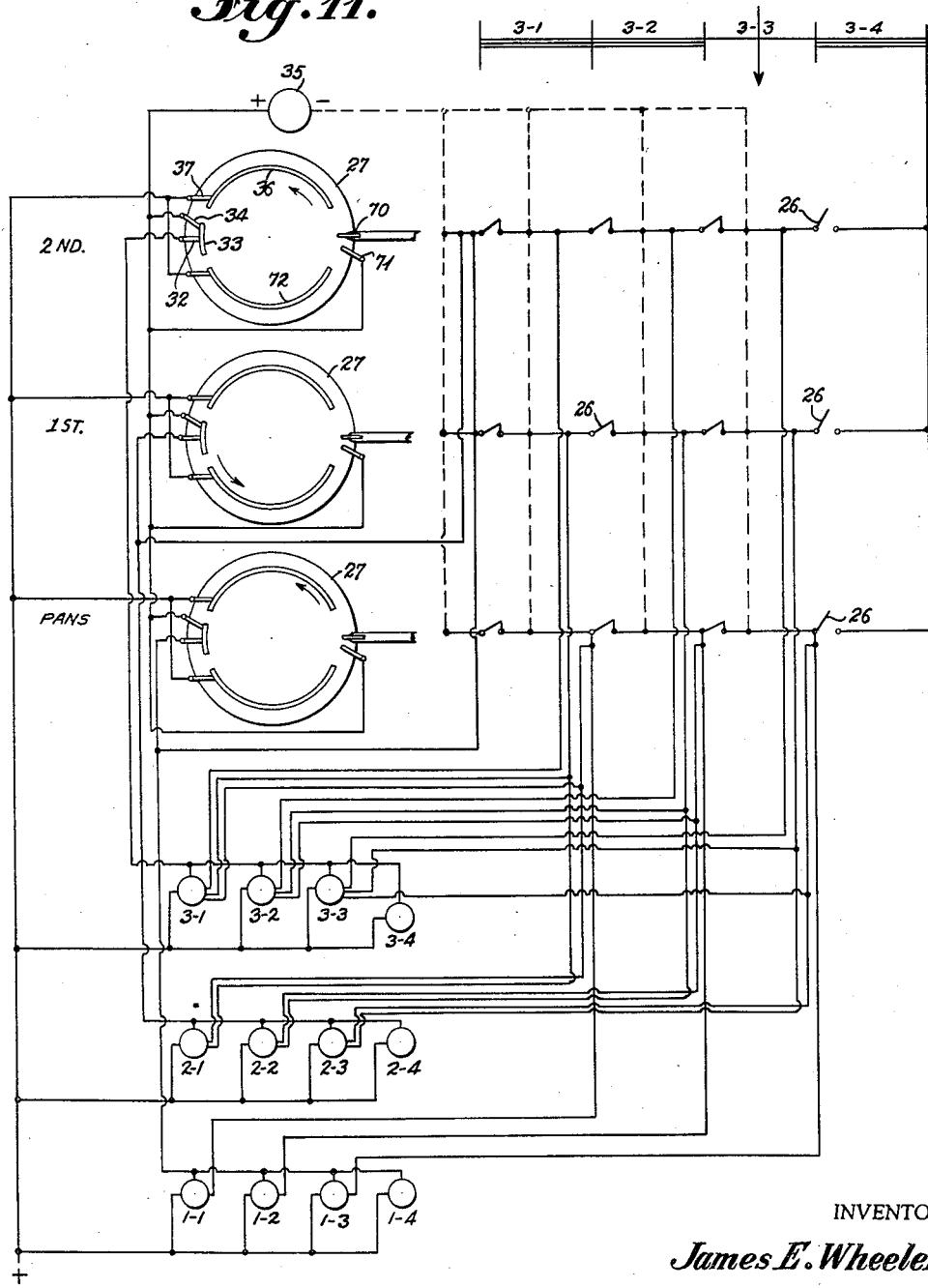
INVENTOR
*James E. Wheeler*
BY *Stevens, Davis, Miller and Mosher*
ATTORNEYS March 29, 1960 J. E. WHEELER 2,930,496
STORAGE APPARATUS
Filed April 17, 1956 12 Sheets-Sheet 12
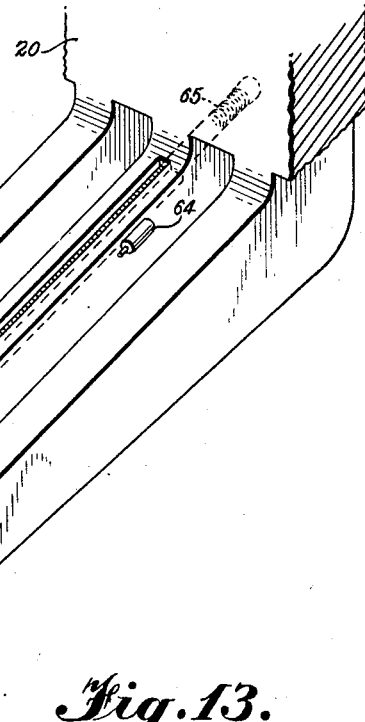
Fig.12.
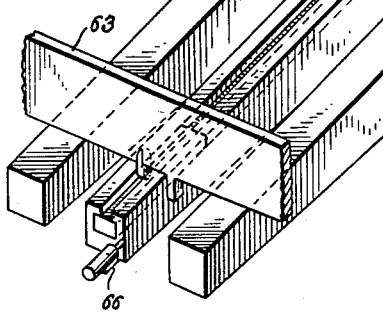
Fig.13.
Fig.14.
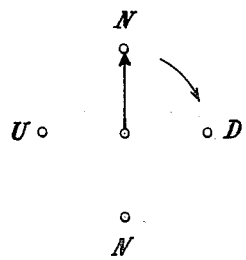
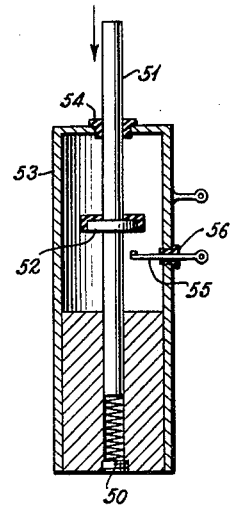
INVENTOR
James E. Wheeler
BY Stevens, Davis, Miller and Mosher
ATTORNEYS

United States Patent Office 2,930,496
Patented Mar. 29, 1960

2,930,496
STORAGE APPARATUS
James E. Wheeler, Grand Rapids, Mich.
Application April 17, 1956, Serial No. 578,831
8 Claims. (Cl. 214—16.1)

This invention relates to improvements in storage apparatus and, more especially, such apparatus adapted for storing vehicles, for example, motor vehicles and the like.

By the use of my invention, there is great economy in space provided in the storing of motor vehicles and individual vehicles may readily be placed in storage and removed therefrom with little or no disturbance to the remaining vehicles and with no danger of injury by collision.

The efficiency of a garage or parking place has always been low because only a small amount of the total space is available to accommodate vehicles. Inasmuch as it is impossible to determine in advance the order in which parked vehicles will leave, it is necessary in any garage or parking place in which vehicles are driven to and from their parking spaces entirely under their own power, so to arrange all the spaces that there is always free access to each space irrespective of whether the others are occupied or not.

Because of the large amount of floor space taken up by ramps, and turning areas, it has been proposed to employ a traveling crane and lift. In this system the vehicle is elevated by the lift and stored in pigeon holes on either side of the lift carrier. However, the entire lift area must be open in order to provide free access to each storage space and this lift area is therefore lost for storage purposes. Moreover, the time required for the storage and return of cars becomes excessive in this method. It is not always possible to efficiently utilize the lift as it is seldom that vehicles are stored and returned from the same level. During the morning hours the lift will usually be empty on the return trip and during the evening hours the lift may be used only to return vehicles from an upper level.

The objects of my invention are first, to provide improved means for making it possible to store a large number of vehicles in a given space, at the same time permitting entrance and removal of any vehicle to or from any storage space without removing any of the stored vehicles.

The second object of my invention is to decrease the time required for moving a vehicle into storage and removing it therefrom. The invention is especially valuable for use in larger cities, and metropolitan districts where storage space for motor vehicles is at premium and where the placing of vehicles in storage and the removal therefrom with ease and facility is especially desirable.

Among the features of my invention, in the provision of quick, easy, safe and economical storage for vehicles. By the use of my invention the car may be locked prior to storage and moved mechanically.

By the use of my invention, a large proportion of any given space may be effectively utilized for the storage of vehicles and, at the same time, any individual vehicle can be placed in storage or removed therefrom with a relatively small amount of movement of other stored vehicles and by way of paths that are direct and little wider than the vehicle.

Another new and novel feature of my invention is the development of vehicle carriers into separate and distinct sections; a lift fork section to support the vehicle during vertical movement and a horizontal carriage section which will connect to the lift fork section thereby forming a unitary carrier that may be shifted laterally.

According to this invention a parking arrangement for a garage, parking place, or the like comprises a plurality of closely spaced movable vehicle carriers each of which is movable laterally, and means for moving vertically the lift fork section of any selected vehicle carrier directly to the position at ground level for receiving or returning an automobile.

Other objects, advantages and features of my invention will hereinafter appear.

Referring to the accompanying drawings which illustrate what is at present deemed to be a preferred embodiment of my invention, Figure 1 is a perspective view of a parking building constructed in accordance with my invention, Figure 2 is a perspective view of the entrance and exit driveways, illustrating the transfer conveyors. The vertical and horizontal tracks are shown with the shift mechanism and vehicle carrier removed.

Figure 7:
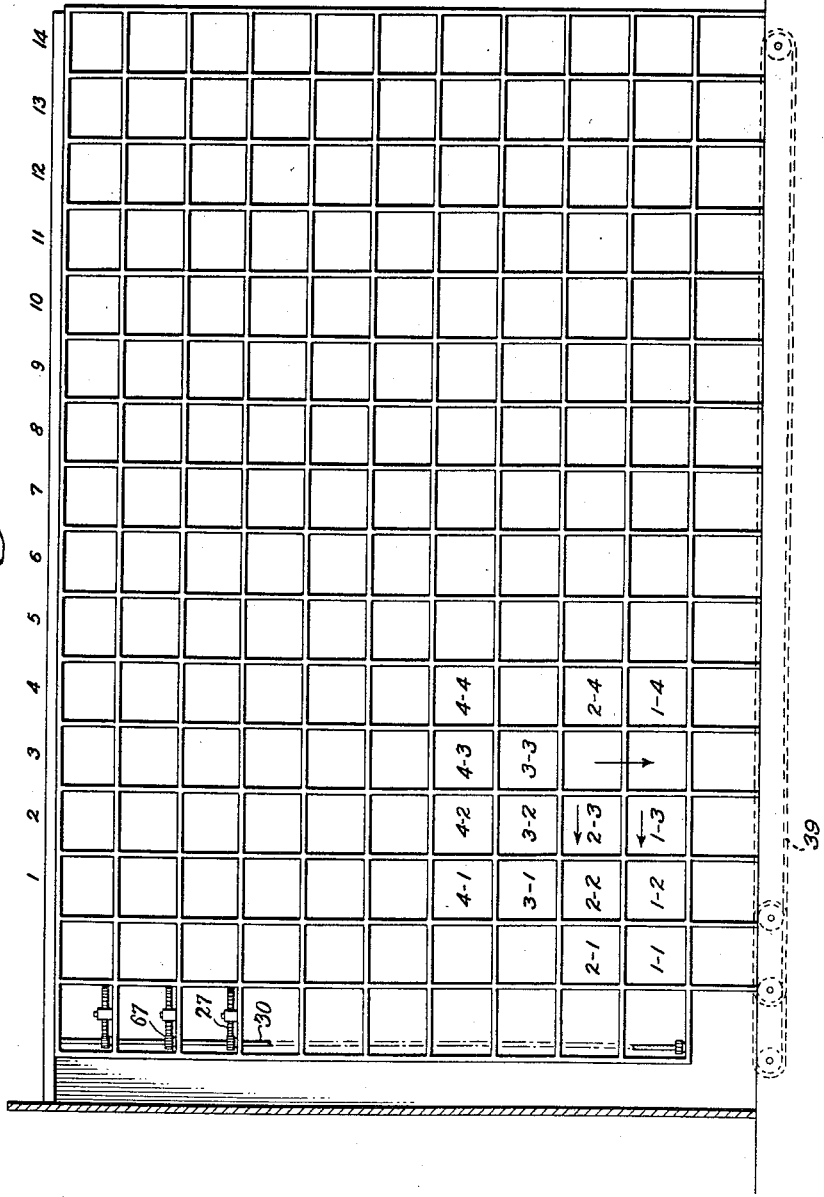
Figure 8:
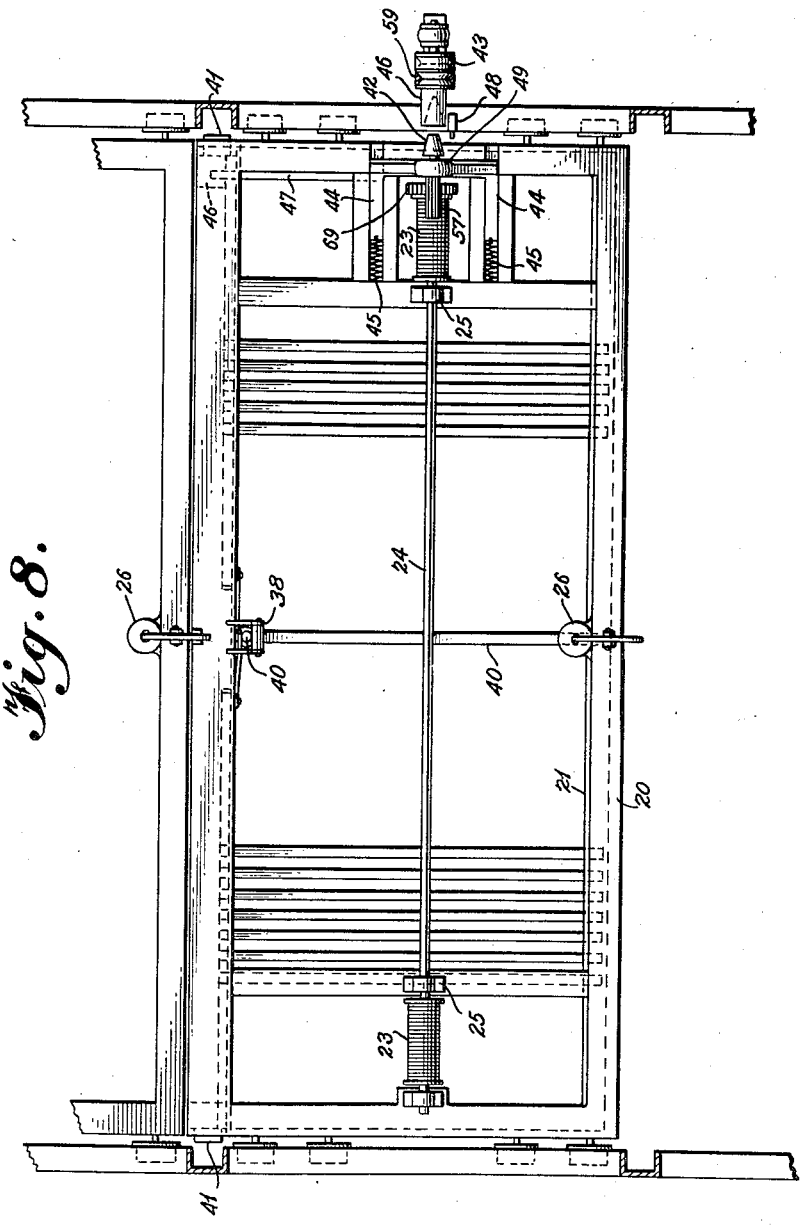

Figure 7 is a typical sectional view through a bay.
Figure 8 is a plan view of a vehicle carrier.
Figure 9 is a side view of a vehicle carrier.
Figure 10 is an end view of a vehicle carrier.
Figure 11 is a wiring diagram of a control panel for shifting and disconnecting trains.
Figure 12 is a sectional view of a tire switch.
Figure 13 is a sectional view of a make-break switch.
Figure 14 is a diagram of a 4-position stepping relay.
Figure 15 is an elevational view of the hoist drive.

Building

Figure 1:
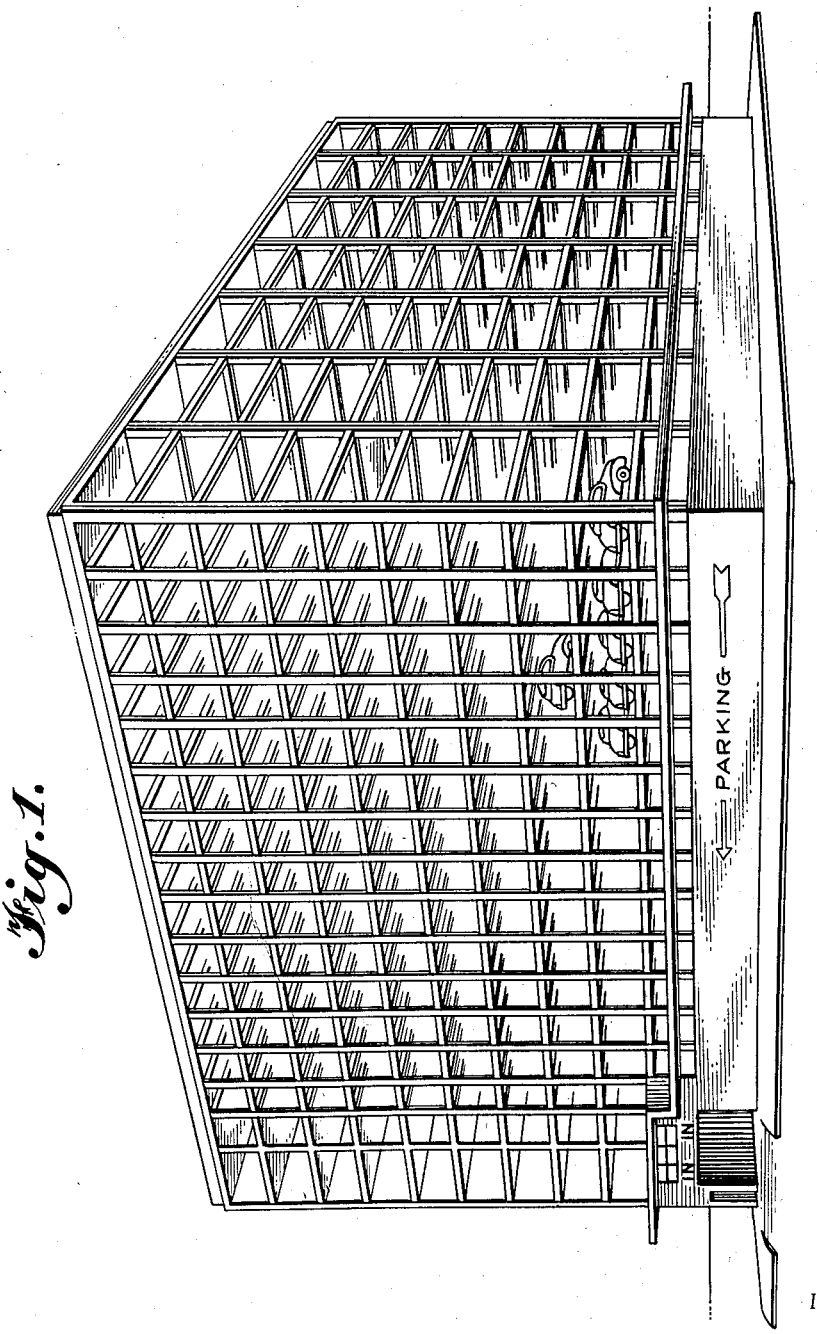

As illustrated in the drawings, Figure 1 shows a parking building almost entirely open on all sides, the basic structure being made up of horizontal and vertical track members necessary for the "shuffling" or shifting operation of the vehicle carriers and the vertical travel of the lift fork sections.

Figure 2:
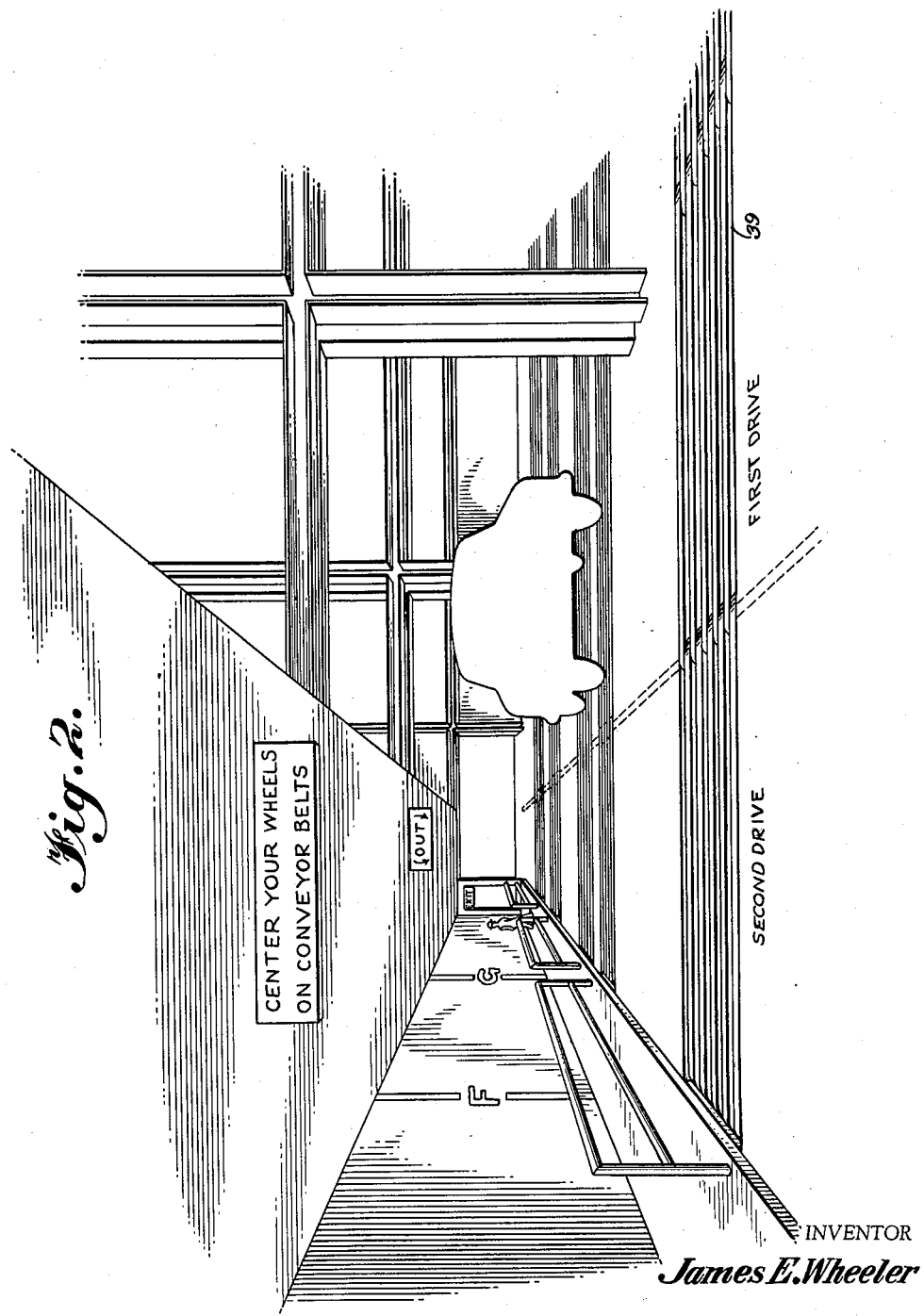

It will be observed from Figure 2 that the entire first floor is used for the ingress and egress driveways and the multiple reversible belt conveyors which transfer the cars horizontally from the first driveway into the building. The second driveway is for speed in taking incoming cars and returning them to their owners; this driveway has a belt conveyor that is clutch-operated off of the first driveway conveyor and is capable of transferring cars to or from the first driveway. The use of two driveways saves considerable time as a customer during rush hours can be getting out or into his car on the second driveway while other cars are being stored or returned in the first driveway.

Figure 6:
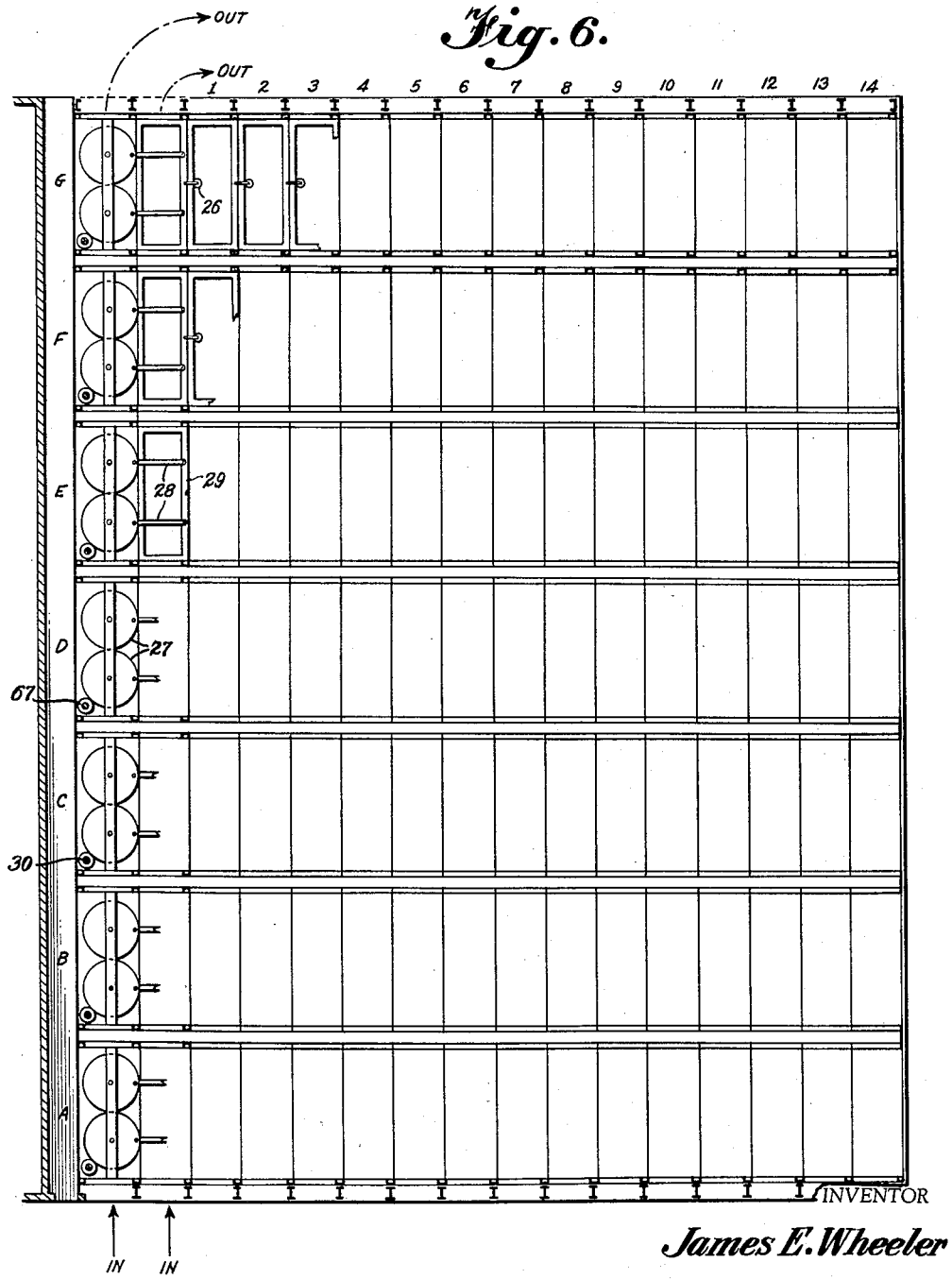
Figure 6 is a plan view of the parking building taken at the third storage level.

Figures 6 and 7 show the efficient utilization of the space within the parking building. Each storage floor is divided lengthwise into seven bays which will accommodate fourteen cars in rank, the positions being identified in Figure 6 by the numerals 1 through 14. Each bay is approximately twenty feet in length and runs the width of the building. Bay A is positioned near the entrance to the building and Bay G near the exit. The building illustrated is eleven stories high and has ten storage floors. The total number of cars accommodated in each bay, therefore, is ten times fourteen or one hundred forty vehicles, and the building will readily accommodate 980 vehicles. The space over the first driveway (8 ft.) is reserved for the lateral shifting of vehicle carriers in a manner that will be described below.

On the second building level, or the first storage floor, I use the space over the second driveway (8 feet) and the pedestrian walk (5 feet) for lounge and toilets and auxiliary power plants. Over this area just described we have nine similar areas thirteen feet in width and running the length of the building which can be used for washing and greasing or for the dead storage of cars.

For public safety and extra stability, the first floor is partially enclosed using masonry or concrete. The areas for the lounge as well as those for washing and greasing, referred to above, are covered with corrugated plastic sheets on the exterior; this transmits light and acts as a windbreak. The cashier's booth is located in a portion of the walkway at the extreme left side of the building on the ground floor. An automatic stop block (not shown in the drawings) is located in the two driveways at each bay, and is controlled by the cashier. When the stop block is lifted a light also lights up showing the incoming customer the bay in which he is to stop.

Vehicle carriers

The vehicle carriers are composed of two parts; the lift fork section 20 and the top carriage section 21, as illustrated in Figures 9 and 10. These two sections of the vehicle carrier are secured together by cables 22 to form vehicle carriers approximately eight feet wide by eight feet high and twenty feet in length. Vertical operation of the lift fork section of the vehicle carrier is accomplished by rotation of the cable drums 23 fixed on shaft 24 and supported by bearings 25.

Figure 4:
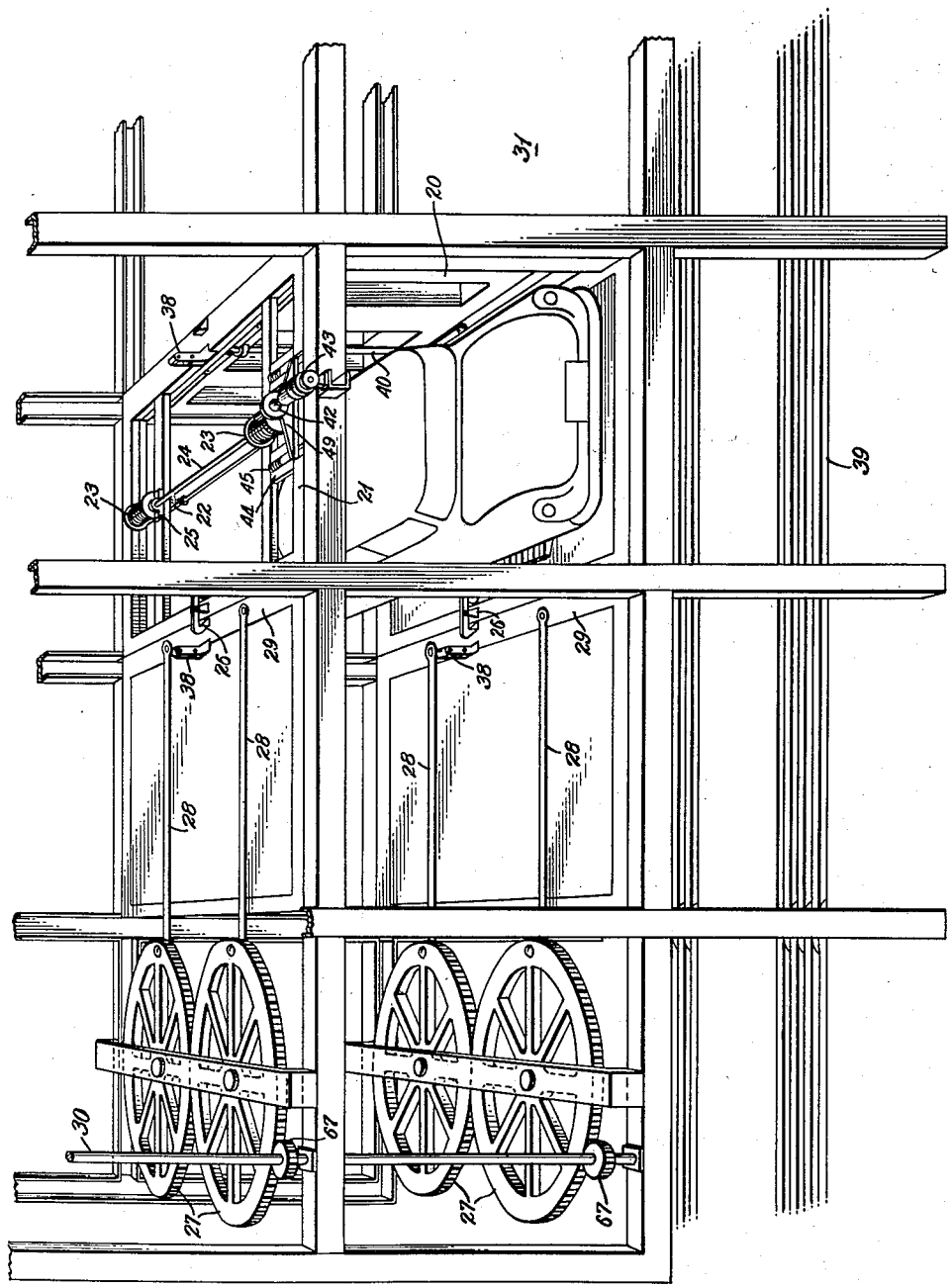
Figures 4 and 5 are also perspective views and illustrate the shift mechanism for lateral movement of the vehicle carriers.
Figure 5:
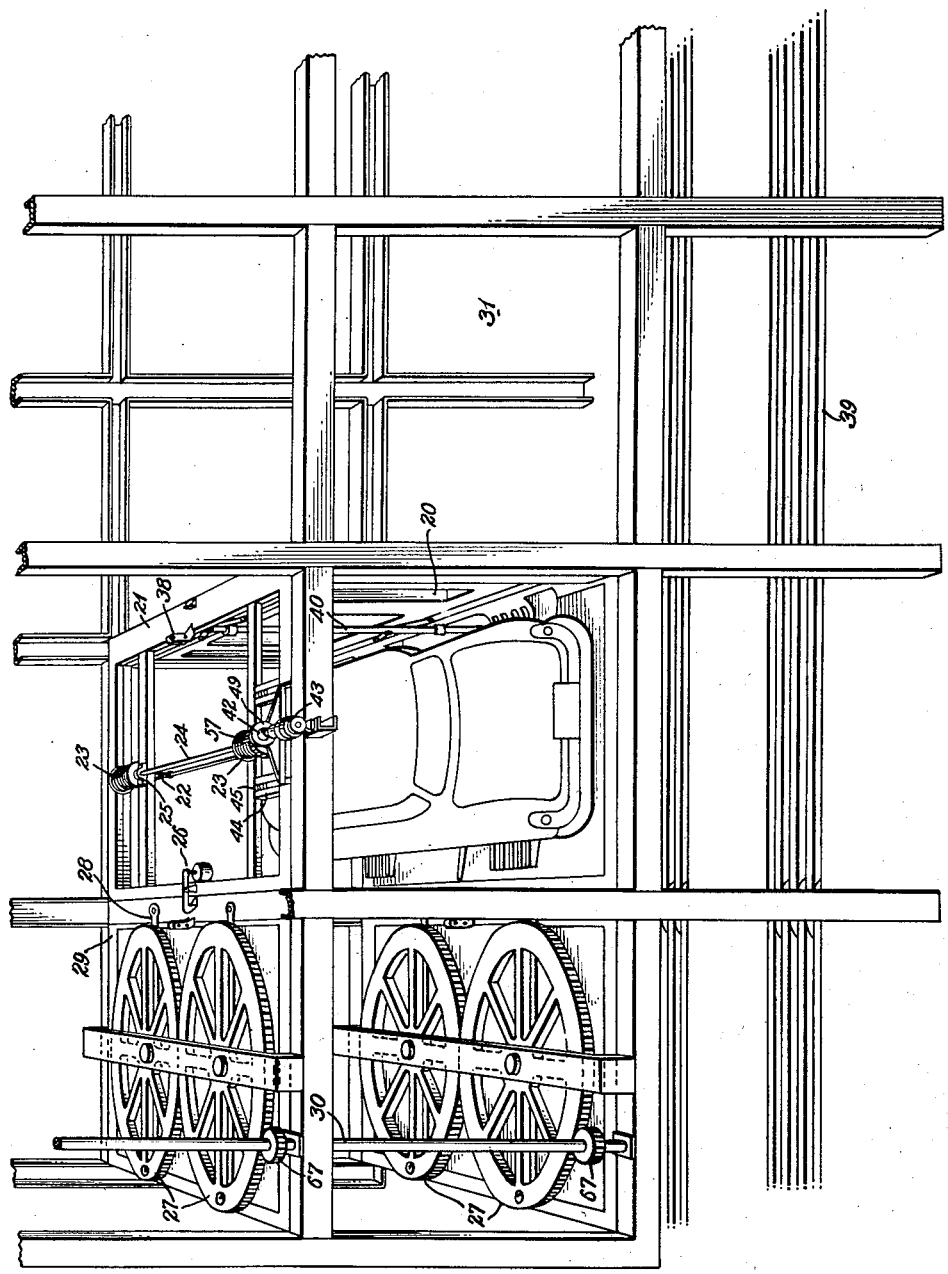

The operation of the shift mechanism for the lateral movement of the assembled vehicle carriers is apparent from Figures 4 and 5. It will be observed from these drawings that individual vehicle carriers may be joined to form a train by the solenoid released gravity hooks 26 present on each individual carrier. This hook coupling can be opened at any point to break the train of vehicle carriers by energizing the proper solenoid. Power sufficient to shift all vehicles within the bay at any level is transmitted through intermeshed drive gears 27 that rotate in opposite directions, thus applying equal force through the pitman arms 28 to the master carriage 29 and throughout the train. All drive gears throughout a bay (at each storage level) may be powered by a single motor through the vertical gear shaft 30 (see Figures 4 and 5) or an equivalent gear train. Figure 4 shows the position of the drive gears and pitman arms in the "start" position. Figure 5 shows both drive gears after 180° of rotation in the "shift" position. It will be noted that the shift mechanism for any storage level is located above that level.

Inasmuch as the shifting of the vehicle carriers is for the purpose of clearing a vertical passage for a particular lift fork section, it is not necessary to have any shift mechanism on the top storage floor (see Figure 7). To conserve power and for other reasons that will become apparent from the following description, when removing vehicles from the lower levels, it is desirable to disengage the solenoid-operated gravity hook between the master carriage and the train of vehicles at all storage levels above the vehicle carrier being removed. Under these circumstances, the only vehicle carriers moved by the shift mechanism are those below the lift fork section to be lowered.

Operation

The rapid movement of cars to and from storage that is possible by the use of my storage apparatus will be apparent from Figure 7. If the third position on the third storage level in any bay is vacant, the vehicle may be stored in that position. To store the vehicle the bay attendant pushes a button which breaks the train at the first and second storage levels between the third and fourth carriers. This same button will lift the hook that connects the first carrier to the master carriage at the third through the ninth storage level. The shift mechanism then operates to open a vertical shaft beneath the vehicle carrier 3–3 as indicated on Figure 7. During this shift the train of vehicle carriers at the third storage level and above does not move. When the vertical shaft is cleared, the lift fork section of vehicle carrier 3–3 is automatically lowered to the ground floor, the fork of the lift passing beneath the surface of the conveyor belt 39. The bay attendant then operates the conveyor 39 to move the parked vehicle onto the lift fork section of the vehicle carrier 3–3. When the vehicle is in place over the lift fork section, that section is automatically moved vertically in a manner to be described below until it reaches the storage position at the third storage level. The shift mechanism then automatically returns to its original starting position and each vehicle carrier at every storage level is reunited with the train by the individual solenoid-operated gravity hooks. To return the vehicle to the ground floor, the same cycle is repeated.

It is only necessary for the bay attendant to operate two controls. By the mention of my invention, a single button is provided for each vehicle carrier which automatically shifts the vehicle carriers at lower levels out of the way and lowers the chosen vertical lift fork section to the ground floor. Return to the original position is also automatic and takes place when a vehicle is loaded either onto or off of the lift fork section.

In addition to this control panel which has one button for each position in the bay, the bay attendant must operate the belt conveyor to and from the driveway. This is accomplished by a reversing switch. A friction clutch operating off of the main belt conveyor enables the bay operator to transfer vehicles between the two driveways.

My invention will now be described by following the movement of a vehicle into storage and the return of the same. During a rush hour two cars may enter the first and second driveways simultaneously and both may be directed to bay C as a section of the garage that is not filled. The cashier, by pushing a button, lights a sign and raises a stop block in both driveways which positions both cars for a proper alignment with the conveyors in bay C. Both decar and are given a claim check by the attendant marked with that bay number. The driver of the car in the first drive is given a claim check C–3–3, indicating that the vehicle carrier to be used is in bay C on the third storage floor in the third file. To get that particular lift fork section down into position, the bay attendant throws the 3–3 switch. This switch energizes the solenoids which disconnect the master carriage from the train on all floors above the second floor; energizes the solenoids to break the coupling between the third and fourth horizontal carriage sections at the first two storage levels; and shifts the first three carriers of the train on the first two storage levels to the left eight feet. This opens up a vertical passage for the descent of the lift fork part of the carrier 3–3, as indicated by Figure 7, which shows the position of all vehicle carriers after the shift.

The wiring diagram of the control panel for automatically uncoupling and shifting carriages is illustrated in Figure 11. The system of controls illustrated applies to a system of four vehicle carriers in a file arranged at three storage levels. However the principles to be discussed in connection with this wiring diagram may be applied equally well to larger buildings having 10 or more storage levels. In Figure 11 the drive gears 27 are located above the first and second storage levels and the lower drive gear is located at level above the conveyor belt (see Figures 4 and 5). When the button 3–3 is pushed the current flows through the brush 32, insulated ring 33 and brush 34 to a time-delay relay 35 which energizes the drive gear motor after permiting time for the solenoid-operated gravity hooks to open. All hooks are opened between position 3 and 4 below the third storage levels as indicated on the diagram. Reference to Figures 4 and 5 will indicate that the drive gear at the lower level, level 31, operates only the horizontal carriage section of the vehicle carrier. These horizontal carriage sections may be covered with sheet metal and serve as pans to prevent grease and falling objects from reaching the floor below. The horizontal carriages at the lower level also cooperate with the center bar 40 of the lift fork section in a manner that will be described below.

As the drive gear 27 rotates counterclockwise, the brush 32 will engage the insulated contact ring 36. In Figure 11 the gap between ring 33 and 36 is much exaggerated for purposes of clarity. Actually, this gap is sufficiently small that the current flow is only momentarily interrupted when the brush 34 passes from ring 33 on to ring 36. Push button 3–3 may now be released by the attendant; the current will continue to flow through brush 37 and ring 36 to brush 34. The rotation of all drive gears is continued through 180° at which time the brush 34 no longer contacts ring 36 and the motor is stopped. In order to assure that the drive gears always stop on dead center, a spring-loaded pin may be mounted to engage a depression on the periphery of the gear. The pin, if employed, is withdrawn from the depression prior to starting the drive gear motor by a solenoid connected in series with the brush 32. Inasmuch as the system shown in Figure 11 has only three storage levels, no shifting is required above the second storage level. Referring now to Figures 8, 9 and 10, it will be apparent that when the top carriage section of vehicle carrier 2–3 is withdrawn from beneath vehicle carrier 3–3 the rollers 38 on the top carriage section of vehicle carrier 2–3 forces the center bar 40 of the vehicle carrier 3–3 downwardly to its lowest position. This downward movement of the center bar extends the guide blocks 41 at either end of the lift fork section to engage the vertical track. The operation of the center bar 40 will be apparent from Figure 9. In addition to engaging the guide blocks 41, the movement of the center bar moves the conical clutch 42 outwardly to contact the belt drive 43. Reference to Figures 8 and 9 will indicate that the conical clutch is mounted on movable bearings 44 and spring–loaded by compression springs 45 to issue positive contact with the female friction clutch 46. Movement of the center bar downward extends the guide blocks 41 and conical clutch 42. Movement of the center bar in an upward direction will retract the guide blocks 41, and inasmuch as a notch 46 in the lateral connection to the guide blocks engages lever 47 attached to the conical clutch 42, the conical clutch is retracted against the pressure of the springs 45 simultaneously with retraction of the guide blocks.

When the guide blocks and conical clutch are extended by the downward movement of the center bar as described above, the switch 48 is mounted adjacent to the conical clutch and is closed by bearing 49, which supports and moves with the clutch. The switch 48 is a make-break switch which makes in one direction only (when the switch button is pushed inwardly). Inasmuch as this type of make-break switch is employed for several purposes in my invention, I have illustrated the construction of this switch in Figure 13. The arrow indicates the direction that the plunger moves in making connection. This switch consists of a plunger mounted in a cylindrical container and held securely in position by the compression spring 50. The contact 52 on the plunger bar 51 is grounded to the container 53 through the slide bearing 54. The spring contact 55 is insulated from the cylinder container by insulation bushing 56. The rear and edge portion of the contact 52 is insulated and, therefore, the only contact with the spring occurs when the plunger is moved in the direction of the arrow. When pressure on the plunger is released the spring 50 will return the plunger to its original position without making an electrical contact with the spring 55.

A make-break switch of the type illustrated in Figure 11 is, as mentioned above, positioned adjacent to and operated by the conical friction clutch bearing. This switch is connected to a 4-position stepping relay similar to that illustrated in Figure 14. The movement of this stepping relay is in a clockwise direction and the electrical impulse from the make-break switch 48 causes the stepping relay to shift to the down position which closes the circuit to the drive motor, thus rotating the female friction clutch 46 in file 3 through the belts 59 at each storage level illustrated in Figures 9 and 15. In the third file, the carrier at the third storage level has its clutch engaged by the movement of center bar 40 described above. The gear 57, which operates cable drum 23, is of such size that the vertical section of the vehicle carrier will descend at the rate of about three hundred sixty fieet per minute.

Figure 3:
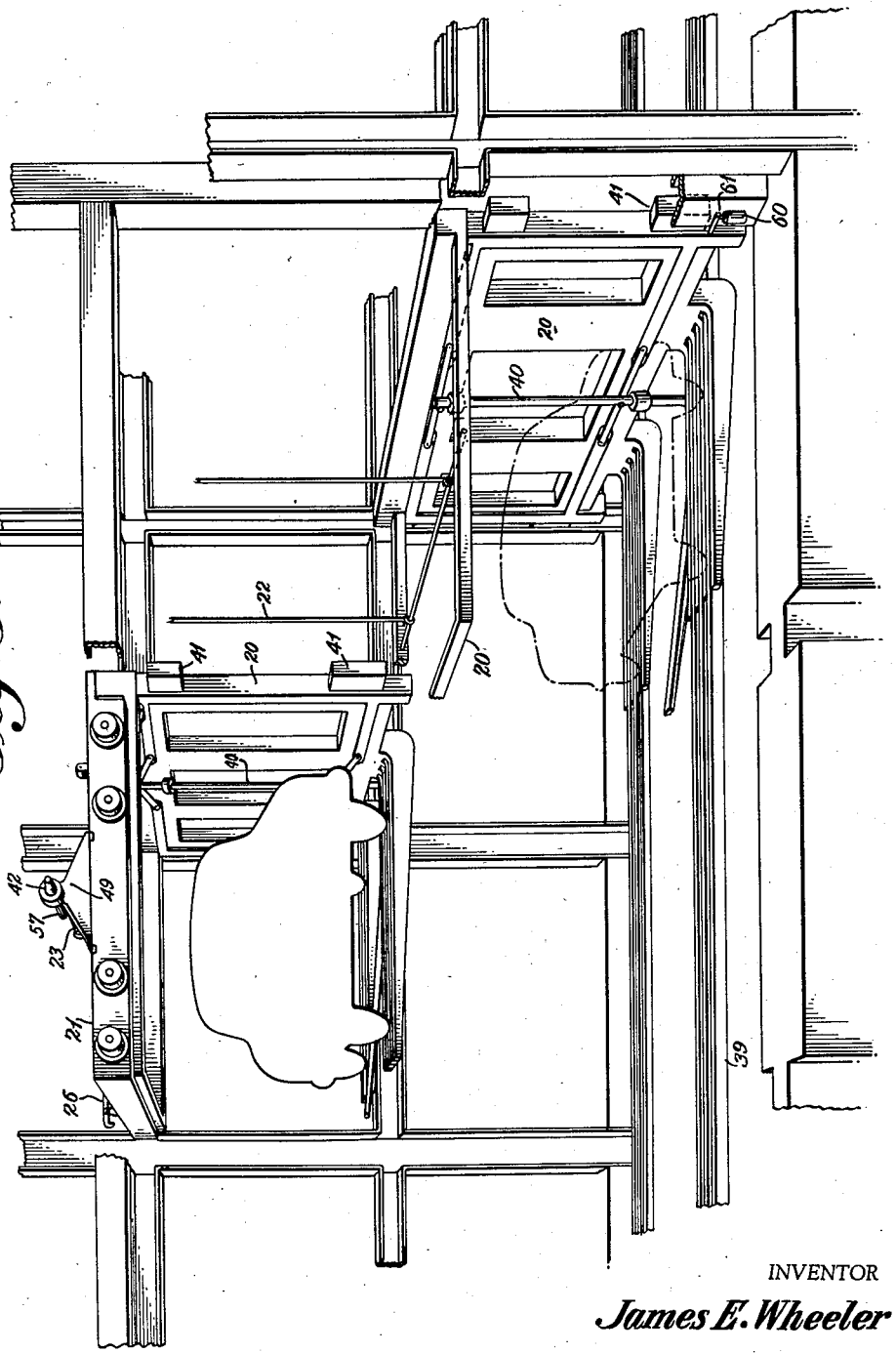
Figure 3 is a perspective view, partly in section, of two vehicle carriers, illustrating a complete vehicle carrier at the first storage level and a lift fork section at ground floor level.

Referring now to Figure 3, when the lift fork section of vehicle carrier 3–3 has descended to the ground level a switch 60, positioned on the vertical track, is depressed by projection 61. This switch 60 is identical with switch 48 illustrated in Figure 13 and operates in a similar manner to send an electrical pulse to the stepping relay of Figure 14. The second pulse, however, throws the stepping relay to its bottom neutral position and shuts off the lift motor.

The bay attendant may now move the vehicle from the inside driveway onto the lift fork section by starting the motor, which drives the conveyor belt 39, and engaging the clutch, which connects the conveyor belt in driveway No. 1 to the main conveyor belt.

As a vehicle is conveyed into the garage and passes over the forks of the descended lift fork section, a wheel of the vehicle will engage a tire plate 63. The operation of the tire plate will be apparent from Figure 12. As the vehicle is moved by the conveyor belt 39 onto the lift fork the wheel engages the plate 63 and moves it against compression spring 65 until the lower projection of plate 63 contacts switch 64. The switch 64 is similar in construction to that shown in Figure 13 and is mounted on the lift fork section in a position to be closed by the tire plate when the vehicle is positioned on the lift fork section. This switch 64 operates the stepping relay which switches to the third or "up" position. In this "up" position the current to the lift motor is reversed and the lift fork section and vehicle are elevated to the third storage floor. A make-break switch 62, of the type illustrated in Figure 11, is mounted on the top carriage section and is closed by the ascending lift fork section; this electrical impulse will shift the stepping relay to its original or neutral position, thus shutting off current to the drive motor when the lift fork section has rejoined the top carriage section. An identical make-break switch 68 operates a time delay relay which impresses a voltage of appreciable duration on brush 70 (see the wiring diagram of Figure 11). Inasmuch as the drive gear 27 is in the shift position, the insulated ring 33 will be in contact with brush 70 and will transmit current from brush 70 to brush 71, thus energizing the time delay relay which operates the gear drive motor. The current flow continues through contact ring 72 until the pitman arms are in their extended positions and all top carriage sections have been shifted back to their original position. Of course, if a spring-loaded pin is employed to make certain that the drive gears always stop on dead center, the solenoid which withdraws the pin, must be connected in series with brush 70. Upon return to their original position all vehicle carriers will be connected together by the gravity hooks to form a complete train.

The cycle described above is repeated when any car is withdrawn from storage. Using the vehicle carrier 3–3 again, for example, the attendant will push button 3–3 (Figure 11) to open the solenoid-operated gravity hooks at the first and second storage levels and beneath the first storage level. Simultaneously, the connection to the conductor ring 33 through brush 32 will send current through the time delay relay 35 and start the shift drive motor clearing a vertical passage for the lift fork section of vehicle carrier 3–3. Withdrawal of the top carriage section 2–3 again forces the center bar 40 of carrier 3–3 down to extend the guide blocks, engage the conical clutch and close switch 48. The current pulse from switch 48 shifts the stepping relay to the "down" position and starts the lift motor. Upon arrival at the ground floor the switch 60 on the vertical track is again depressed switching the stepping relay to its neutral position and stopping the lift motor. The bay attendant now reverses the belt conveyor to remove the vehicle from the lift. As the wheel of the car is removed from the lift fork the tire plate 63 is forced toward the end of the lift fork by spring 65. In its outer position the tire plate contacts a make-break switch 66, of the type illustrated in Figure 13, and this switch shifts the stepping relay to the "up" position, thus starting the lift motor which raises the lift fork section to its original position. Again, upon reaching its original position the lift fork section contacts switch 62 which returns the stepping relay to neutral and shuts off the lift motor. The lift fork section also closes switch 68 which, through a time delay relay, sends a voltage pulse of appreciable duration to the brush 70. The time delay relay as connected with brush 70 is so adjusted that the duration of the voltage pulse will be sufficient to overcome the time delay of relay 35 and rotate the drive gear until ring 36 contacts brush 71. The return shift is completed by the drive gears 27 until the drive gear reaches the center position with pitman arms fully extended. The gravity hooks automatically couple adjacent vehicle carriages to form a train. It will be noted that as the top carrier section 2–3 is returned beneath vehicle carrier 3–3, the rollers 38 mounted on the top carrier section 2–3 engage the bar lever 40 of lift fork section 3–3 and force it upward, thus retracting the guide blocks and conical clutch.

The gear 67 which meshes with the drive gear 27 is of such size that the drive gears rotate at about 9.2 revolutions per minute. This corresponds to an average lateral shift rate of about 360 ft. per minute. The belt conveyor, which moves vehicles into and out of the garage laterally, also operates at a speed of about 360 ft. per minute. The gears 57 and 69, which determine the rotation rate of the drum 23, may also be chosen so that the rate of vertical travel is in the neighborhood of 360 ft. per minute. Under these circumstances when storing vehicles in the most distant part of the bay no more than thirty seconds should be required for lateral travel on the conveyor belts, and approximately fifteen seconds for vertical travel of the lift fork carriage. The overall time cycle required for storing a vehicle or removing a vehicle from storage, therefore, should not exceed one minute, including shift time.

While the above description sets forth an effective method of operation, it will be obvious that certain safety features might readily be added. For example, a worm gear could be inserted in the gear train between the conical friction clutch and the cable drum. This would reduce the possibility of the cable unwinding and dropping a vehicle. If desired, the cable drums could be fitted with a magnetic brake that would release only when the conical clutch engaged. Switches may be positioned to indicate when a vertical passage is clear, and wire in series with the lift motor to prevent operation of the vertical lift motor in the event that there is any obstruction at any level beneath the lift fork section to be lowered.

The invention is not, of course, limited to the particular arrangements shown and described for many modifications are obviously possible.

What I claim is:

1. In a multi-level storage building, a plurality of dual section carriers regularly arranged at each storage level in rank and file and so positioned that the carriers at different storage levels are vertically aligned within a vertical passageway extending between storage levels; a shift space at each storage level said shift space being positioned at the end of each rank parallel and adjacent to the last file; a solenoid operated hook attached to each carrier and adapted to connect that carrier to its adjacent carrier to form a train; shifting means positioned at the end of each rank and adapted to move connected carriers to and from the shift space; cable means uniting dual sections of each carrier; and a clutch operating to move the cable and one section of each carrier vertically between the different storage levels.

2. In a multi-level storage apparatus, a plurality of carriers; each carrier being constructed of two sections and said carriers being regularly arranged at each storage level in rank and file and so positioned that the carriers at different storage levels are vertically aligned within a passageway that extends between floors; a shift space at each storage level, said shift space being positioned at the end of each rank parallel and adjacent to the last file; means to connect any number of carriers in a rank to form a train; means to move the train to and from the shift space; connecting means uniting the two sections of each carrier; and means to move one section of each carrier vertically between floors.

3. In a multi-level storage apparatus, a plurality of carriers; each carrier having a lift fork section and a horizontal section and said carriers being regularly arranged at each storage level in rank and file and so positioned that the carriers at different storage levels are vertically aligned within a passageway that extends between the different storage levels; a shift space at each storage level the width and length of a file, said shift space being positioned at the end of each rank parallel and adjacent to the last file; means to connect any number of the carriers in a rank to form a train; means to move the train to and from the shift space; connecting means uniting horizontal carriage section and lift fork sections of each carrier; and means to move the lift fork section vertically within the passageway that extends between the different storage levels.

4. In a multi-level storage apparatus, a plurality of carriers; each carrier having an upper section and a lower section and said carriers being regularly arranged at each storage level in rank and file and so positioned that the carriers at different storage levels are vertically aligned; a shift space at each storage level the width and length of a file, said shift space being positioned at the end of each rank parallel and adjacent to the last file; means to connect any number of the carriers in a rank to form a train; means to move the train to and from the shift space; connecting means uniting the upper and lower sections of each carrier; and means to move the lower carrier section vertically between floors.

5. In a multi-level storage apparatus for automotive vehicles, a plurality of vehicle carriers in rank and file formation; each vehicle carrier having an upper section and a lower section and said carriers occupying each storage level with the exception of one vacant file that is used as a shift space; means to connect any number of the carriers in a rank to form a train; means to move the train to and from the shift space; connecting means uniting the upper and lower sections of each carrier; and means to move the lower carrier section vertically between floors.

6. In a multi-level storage apparatus for automotive vehicles, a plurality of vehicle carriers in rank and file formation; each vehicle carrier having an upper section and a lower section and said carriers occupying each storage level with the exception of one vacant file that is used as a shift space; means to connect any number of the carriers in a rank to form a train; means to move the train to and from the shift space; connecting means uniting upper and lower sections of each carrier; means to move the lower vehicle carrier section vertically between floors and means for controlling the movements of the vehicle carrier through the building from a central station.

7. In a garage, a skeleton building structure having uprights and laterals spaced to form horizontal passageways and vertical passageways throughout the structure; individual lifts for each vehicle adapted to move a vehicle through a vertical passageway between storage floors; individual horizontal sections corresponding to each lift; means to connect each lift to its corresponding horizontal section to form a unitary vehicle container; a solenoid operated hook attached to each unitary vehicle container and adapted to connect each container to its adjacent container to form a train; and means to shift each unitary container laterally a sufficient distance to clear any vertical passageway between any two storage levels.

8. In a garage, a skeleton building structure having uprights and laterals forming horizontal passageways and vertical passageways throughout said structure; lift fork sections designed to move through said vertical passageways; horizontal sections at each storage level designed to move through said horizontal passageways; cable lifting means attached to the lift fork sections; cable winding drums to raise the lift fork sections to a position at which they are united with the horizontal sections; horizontal shifting means adapted to operatably engage a plurality of said horizontal sections and move the combined lift forks and horizontal sections laterally.

References Cited in the file of this patent

UNITED STATES PATENTS

| | | |
|---|---|---|
| 1,056,231 | Taylor | Mar. 18, 1913 |
| 1,369,393 | Burgess | Feb. 22, 1921 |
| 1,584,212 | Burrell | May 11, 1926 |
| 1,694,084 | Straight | Dec. 4, 1928 |
| 1,725,264 | Garnett | Aug. 20, 1929 |
| 1,783,296 | Lowenstein | Dec. 2, 1930 |
| 1,903,274 | Watson | Mar. 28, 1933 |
| 1,925,348 | Timbs | Sept. 5, 1933 |
| 2,013,482 | Taylor | Sept. 3, 1935 |
| 2,031,392 | Taylor | Feb. 18, 1936 |
| 2,139,772 | Ringe | Dec. 13, 1938 |
| 2,349,389 | Thompson | May 23, 1944 |
| 2,417,910 | Brueeger | Mar. 25, 1947 |
| 2,771,200 | Gilliard | Nov. 20, 1956 |
| 2,826,312 | Francis | Mar. 11, 1958 |
| 2,847,131 | Miller | Aug. 12, 1958 |

FOREIGN PATENTS

| | | |
|---|---|---|
| 337,726 | Great Britain | Oct. 28, 1930 |
| 382,476 | Great Britain | Oct. 27, 1932 |